(12) United States Patent
Dimou

(10) Patent No.: US 12,501,357 B2
(45) Date of Patent: Dec. 16, 2025

(54) TECHNIQUES FOR MEASURING ADJACENT CARRIER FREQUENCIES FOR POWER BACKOFF CONTROL

(71) Applicant: QUALCOMM Incorporated, San Diego, CA (US)

(72) Inventor: Konstantinos Dimou, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 18/047,179

(22) Filed: Oct. 17, 2022

(65) Prior Publication Data

US 2024/0129765 A1 Apr. 18, 2024

(51) Int. Cl.

| | | |
|---|---|---|
| *H04W 24/08* | (2009.01) | |
| *H04W 24/10* | (2009.01) | |
| *H04W 52/02* | (2009.01) | |
| *H04W 52/24* | (2009.01) | |
| *H04W 52/38* | (2009.01) | |
| *H04W 52/52* | (2009.01) | |
| *H04W 72/044* | (2023.01) | |
| *H04W 72/23* | (2023.01) | |

(Continued)

(52) U.S. Cl.
CPC ....... *H04W 52/0206* (2013.01); *H04W 24/08* (2013.01); *H04W 24/10* (2013.01); *H04W 52/243* (2013.01); *H04W 52/386* (2013.01); *H04W 52/52* (2013.01); *H04W 72/0473* (2013.01); *H04W 72/23* (2023.01); *H04W 84/02* (2013.01); *H04W 88/02* (2013.01); *H04W 88/08* (2013.01); *H04W 92/02* (2013.01); *H04W 92/10* (2013.01); *H04W 92/20* (2013.01)

(58) Field of Classification Search
CPC .... H04B 17/0082–3913; H04J 11/0023–0093; H04J 2011/0003–0096; H04L 5/0001–0098; H04W 24/02–10; H04W 36/0005–385; H04W 52/02–60; H04W 56/001–0025; H04W 72/02–569; H04W 84/02–16; H04W 88/02–12; H04W 92/02–04; H04W 92/10–12; H04W 92/16–20
See application file for complete search history.

(56) References Cited

U.S. PATENT DOCUMENTS

| | | | |
|---|---|---|---|
| 2010/0035645 A1* | 2/2010 | Chang | H04W 52/346 |
| 2022/0038057 A1* | 2/2022 | Gutman | H04W 52/143 |
| 2023/0019046 A1* | 1/2023 | Ibrahim | H04W 52/367 |

\* cited by examiner

Primary Examiner — Timothy J Weidner
(74) Attorney, Agent, or Firm — Dalei Dong; Harrity & Harrity, LLP

(57) ABSTRACT

Various aspects of the present disclosure generally relate to wireless communication. In some aspects, a user equipment (UE) may receive one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators. The UE may transmit a measurement report regarding the one or more signals at the one or more carrier frequencies adjacent to the assigned operating carrier frequency. The UE may receive one or more communications transmitted with a power amplifier backoff value based at least in part on the measurement report. Numerous other aspects are described.

30 Claims, 9 Drawing Sheets

(51) Int. Cl.
*H04W 84/02* (2009.01)
*H04W 88/02* (2009.01)
*H04W 88/08* (2009.01)
*H04W 92/02* (2009.01)
*H04W 92/10* (2009.01)
*H04W 92/20* (2009.01)

TECHNIQUES FOR MEASURING ADJACENT CARRIER FREQUENCIES FOR POWER BACKOFF CONTROL

FIELD OF THE DISCLOSURE

Aspects of the present disclosure generally relate to wireless communication and to techniques and apparatuses for techniques for measuring adjacent carrier frequencies for power backoff control.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include receiving one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators. The method may include transmitting a measurement report regarding the one or more signals at the one or more carrier frequencies adjacent to the assigned operating carrier frequency. The method may include receiving one or more communications transmitted with a power amplifier backoff value based at least in part on the measurement report.

Some aspects described herein relate to a method of wireless communication performed by an apparatus of a network node. The method may include receiving a measurement report regarding one or more signals at one or more carrier frequencies adjacent to an assigned operating carrier frequency. The method may include transmitting one or more communications using a power amplifier backoff value based at least in part on the measurement report.

Some aspects described herein relate to a UE for wireless communication. The UE may include a memory and one or more processors coupled to the memory. The one or more processors may be configured to receive one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators. The one or more processors may be configured to transmit a measurement report regarding the one or more signals at the one or more carrier frequencies adjacent to the assigned operating carrier frequency. The one or more processors may be configured to receive one or more communications transmitted with a power amplifier backoff value based at least in part on the measurement report.

Some aspects described herein relate to a network node for wireless communication. The network node may include a memory and one or more processors coupled to the memory. The one or more processors may be configured to receive a measurement report regarding one or more signals at one or more carrier frequencies adjacent to an assigned operating carrier frequency. The one or more processors may be configured to transmit one or more communications using a power amplifier backoff value based at least in part on the measurement report.

Some aspects described herein relate to a non-transitory computer-readable medium that stores a set of instructions for wireless communication by a UE. The set of instructions, when executed by one or more processors of the UE, may cause the UE to receive one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators. The set of instructions, when executed by one or more processors of the UE, may cause the UE to transmit a measurement report regarding the one or more signals at the one or more carrier frequencies adjacent to the assigned operating carrier frequency. The set of instructions, when executed by one or more processors of the UE, may cause the UE to receive one or more communications transmitted with a power amplifier backoff value based at least in part on the measurement report.

Some aspects described herein relate to a non-transitory computer-readable medium that stores a set of instructions for wireless communication by a network node. The set of instructions, when executed by one or more processors of the network node, may cause the network node to receive a measurement report regarding one or more signals at one or more carrier frequencies adjacent to an assigned operating carrier frequency. The set of instructions, when executed by one or more processors of the network node, may cause the network node to transmit one or more communications using a power amplifier backoff value based at least in part on the measurement report.

Some aspects described herein relate to an apparatus for wireless communication. The apparatus may include means for receiving one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators. The apparatus may include means for transmitting a measurement report regarding the one or more signals at the one or more carrier frequencies adjacent to the assigned operating carrier frequency. The apparatus may include means for receiving one or more communications transmitted with a power amplifier backoff value based at least in part on the measurement report.

Some aspects described herein relate to an apparatus for wireless communication. The apparatus may include means for receiving a measurement report regarding one or more signals at one or more carrier frequencies adjacent to an assigned operating carrier frequency. The apparatus may include means for transmitting one or more communications using a power amplifier backoff value based at least in part on the measurement report.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
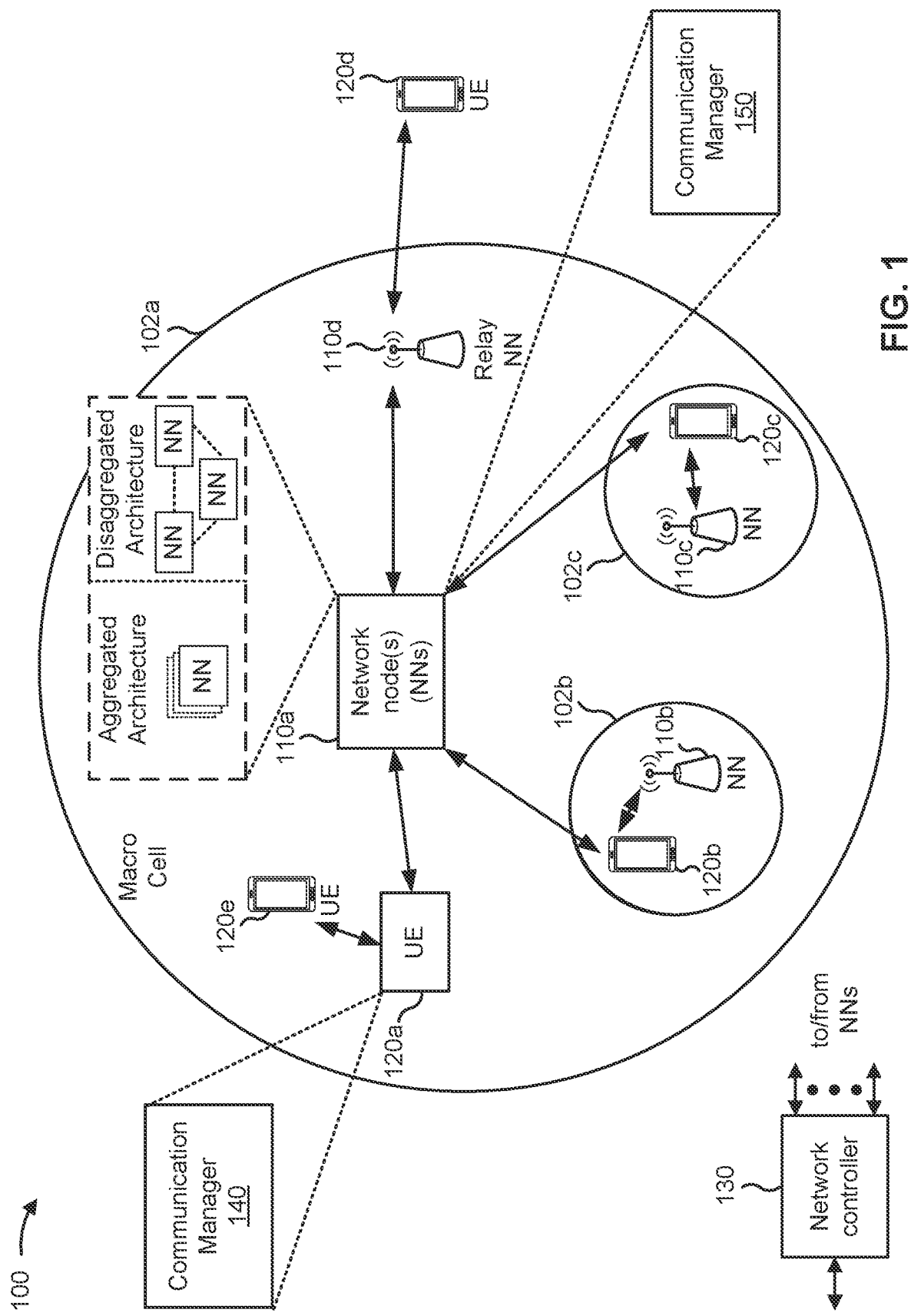
FIG. 1 is a diagram illustrating an example of a wireless network.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators; transmit a measurement report regarding the one or more signals at the one or more carrier frequencies adjacent to the assigned operating carrier frequency; and receive one or more communications transmitted with a power amplifier backoff value based at least in part on the measurement report. Additionally, or alternatively, the communication manager 140 may perform one or more other operations described herein.

In some aspects, the network node may include a communication manager 150. As described in more detail elsewhere herein, the communication manager 150 may receive a measurement report regarding one or more signals at one or more carrier frequencies adjacent to an assigned operating carrier frequency; and transmit one or more communications using a power amplifier backoff value based at least in part on the measurement report. Additionally, or alternatively, the communication manager 150 may perform one or more other operations described herein.

As indicated above, FIG. 1 is provided as an example. Other examples may differ from what is described with regard to FIG. 1.

Figure 2:
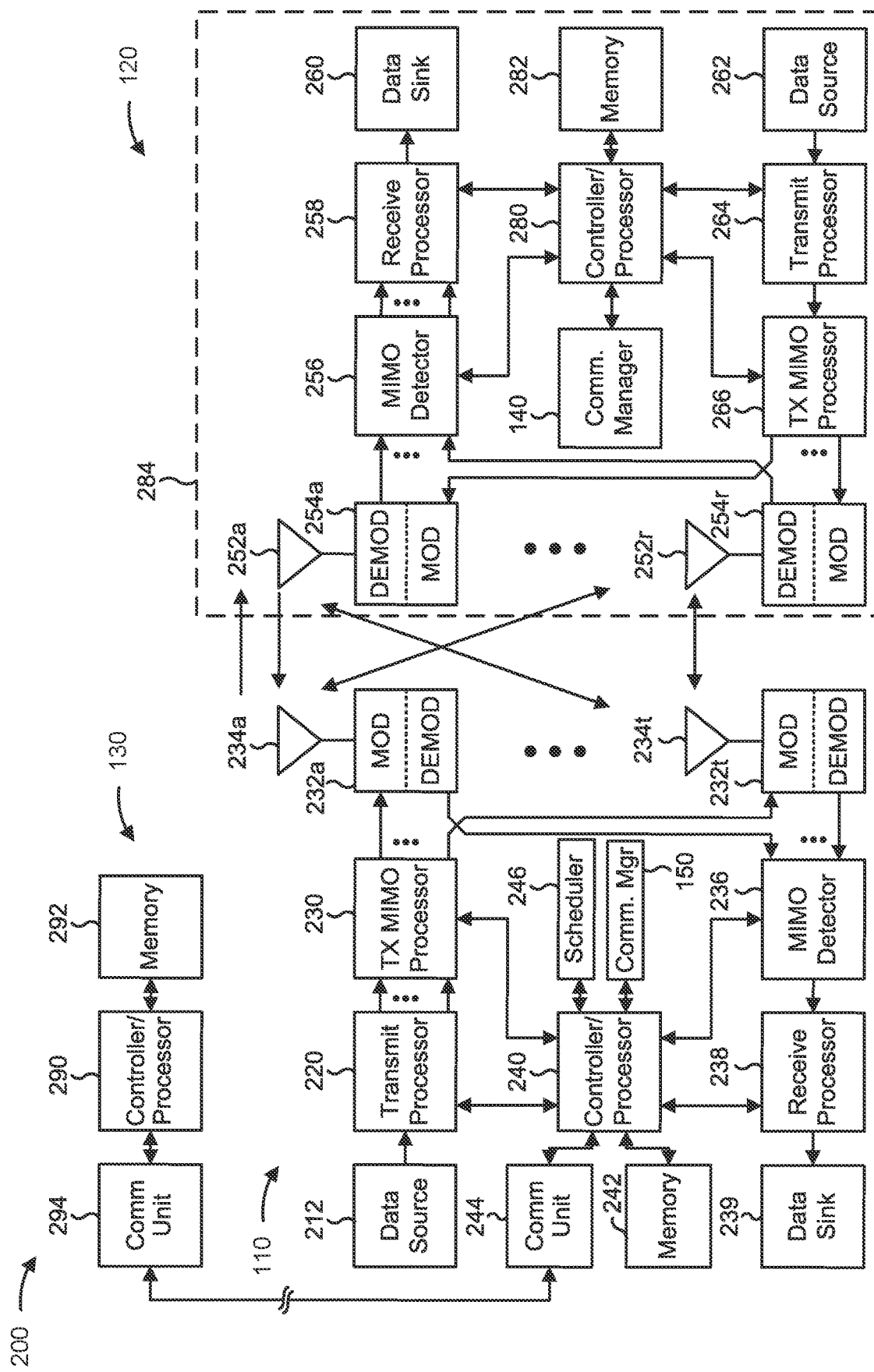
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 5-9).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 5-9).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with measuring adjacent carrier frequencies for power backoff control, as described in more detail elsewhere herein. For example, the controller/processor 240 of the network node 110, the controller/processor 280 of the UE 120, or any other component(s) (or combinations of components) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators; means for transmitting a measurement report regarding the one or more signals at the one or more carrier frequencies adjacent to the assigned operating carrier frequency; and/or means for receiving one or more communications transmitted with a power amplifier backoff value based at least in part on the measurement report. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving a measurement report regarding one or more signals at one or more carrier frequencies adjacent to an assigned operating carrier frequency; and/or means for transmitting one or more communications using a power amplifier backoff value based at least in part on the measurement report. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
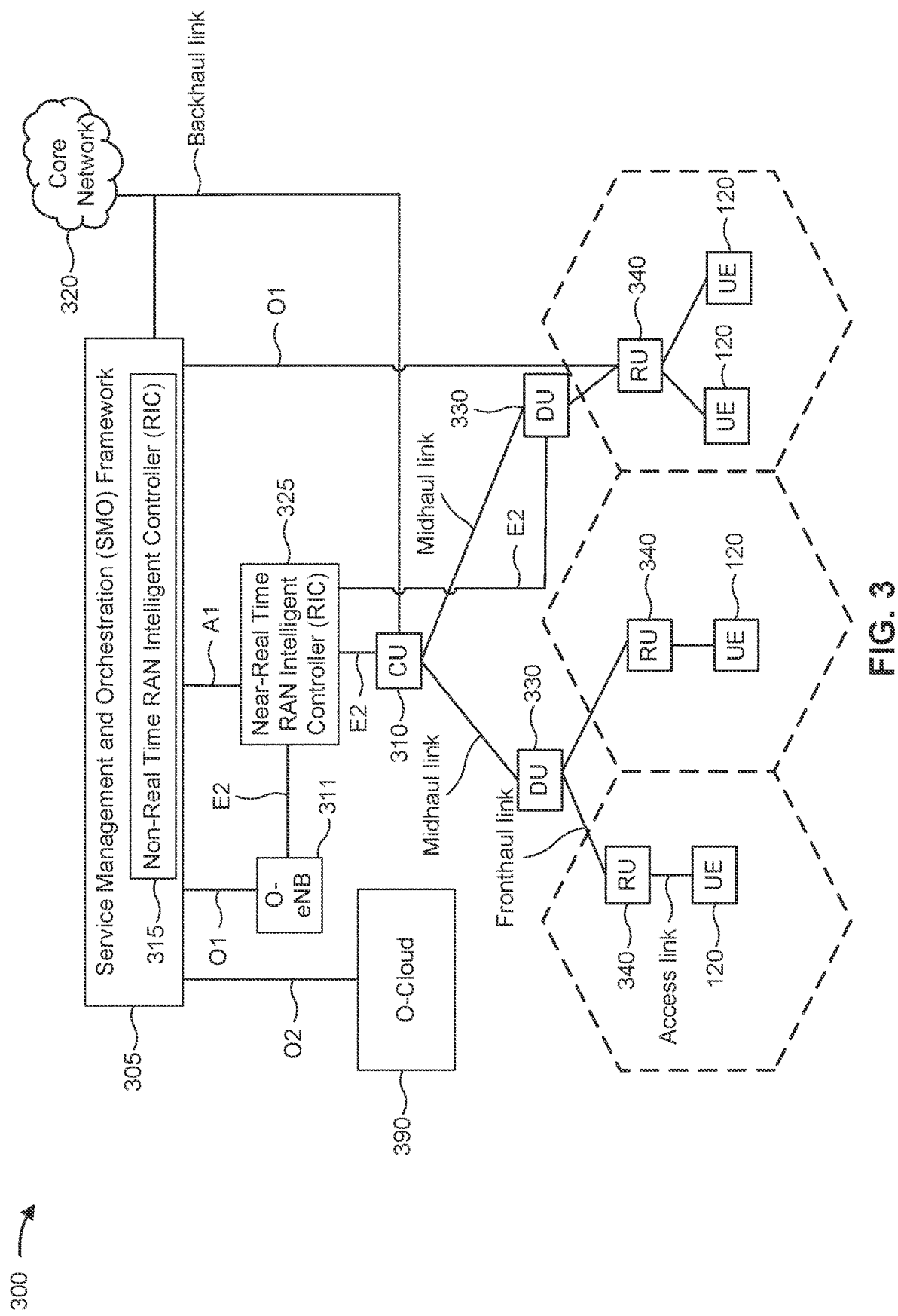
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
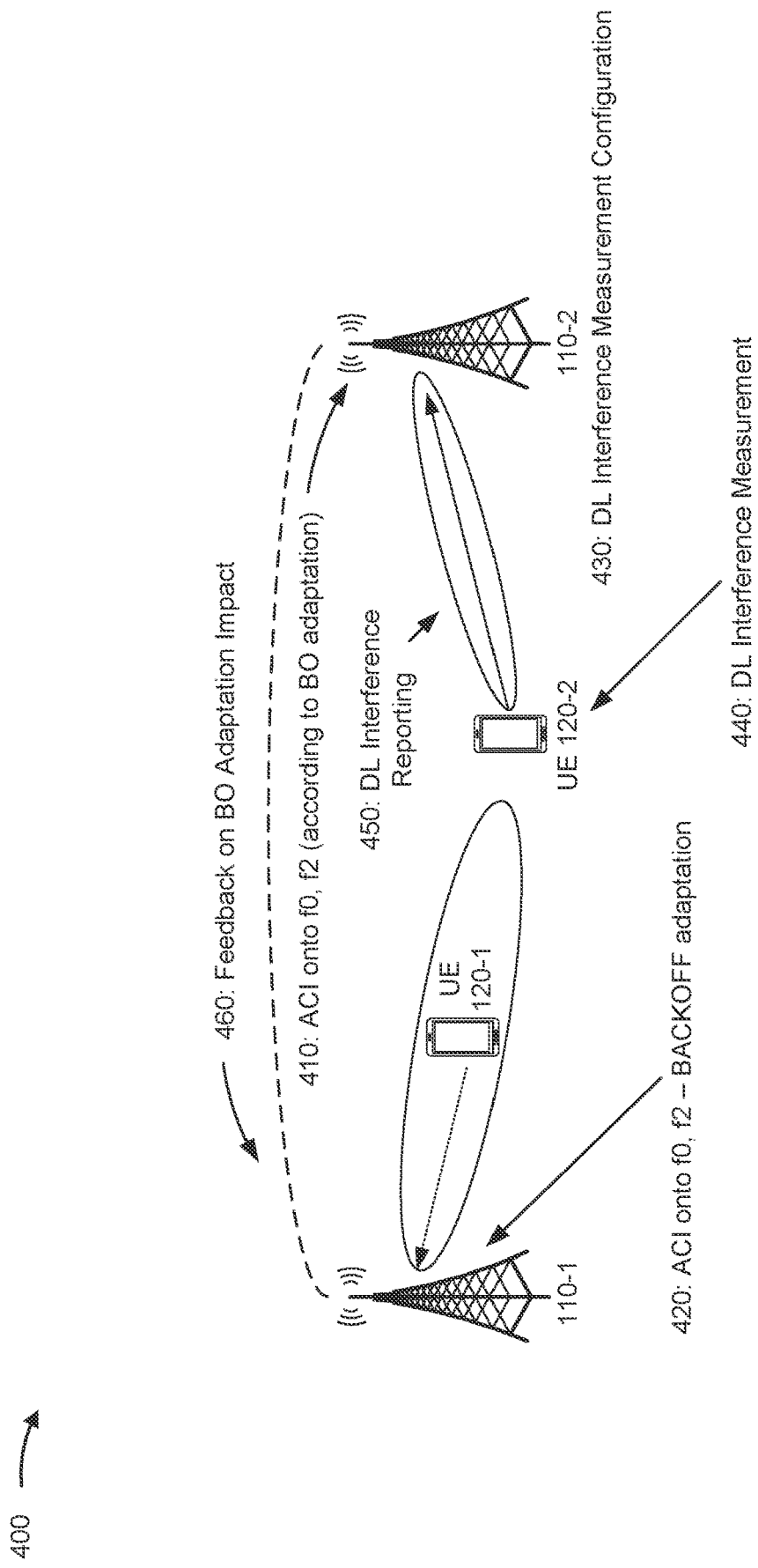
FIG. 4 is a diagram illustrating an example of power adaptation, in accordance with the present disclosure.

FIG. 4 is a diagram illustrating an example 400 of power adaptation, in accordance with the present disclosure. As shown in FIG. 4, example 400 includes a first network node 110-1, a second network node 110-2, a first UE 120-1 (e.g., in a coverage area of the first network node 110-1), and a second UE 120-2 (e.g., in a coverage area of the second network node 110-2). In some examples, both network nodes 110 are associated with the same operator (e.g., and can coordinate measurements and/or power control).

As further shown in FIG. 4, and by reference numbers 410 and 420, network node 110-1, during communication on frequency f1 with UE 120-1, may cause adjacent channel interference on frequencies f0 and f2, which are adjacent to f1, and may perform a power control procedure to mitigate the interference. An adjacent frequency may include a frequency that is contiguous to another frequency, has an index consecutive with another frequency, or is within a threshold range of another frequency. For example, f0 may be contiguous to f1. In another example, f0 may have a first frequency index and f1 may have a second frequency index that is consecutive to the first frequency index. In another example, f0 may be within a threshold wavelength range of f1. In another example, an adjacent channel can be, conceptually, any channel that is subject to adjacent channel interference (ACI) from f1.

In some examples, to perform a power control procedure, the network node 110-1 may perform power backoff relaxation or power supply reduction. For example, the network node 110-1 may reconfigure a power supplied to a power amplifier to reduce a transmit power from an antenna being controlled by the power amplifier. This may allow the network node 110-1 to increase an efficiency of the power amplifier, by reducing an amount of transmit power suppression that is applied to a transmit signal to ensure that the transmit signal does not exceed a threshold signal strength and cause interference. For example, for some network nodes 110, reducing an input voltage supply (backing off) by half, the power amplifier energy consumption is reduced to approximately 3 decibels (dB), which halves network energy usage. Applying power amplifier backoff adaptation can reduce an adjacent channel leakage ratio (ACLR) by approximately 10 dB and can increase an error vector magnitude (EVM) by approximately 8 dB. Because power amplifier energy consumption can be a majority of overall power consumption by a network node 110, halving the backoff of a power amplifier can reduce a total network node 110 energy consumption by approximately 35%. In some cases, the network node 110 may back off a power amplifier, such that neither out-of-band, nor in-band unwanted emissions are generated. Even when some unwanted emissions are generated, the network node 110 may apply digital signal processing algorithms to optimize the unwanted emissions toward being in-band or toward being out-of-band, depending on the communication scenario.

As further shown in FIG. 4, and by reference number 430, network node 110-2 may perform downlink interference measurement configuration. For example, the network node 110-2 may configure the UE 120-2 to perform one or more interference measurements on f2 to determine an amount of interference on f2 from network node 110-1 and UE 120-1 communicating on f1. In another example, the network node 110-2 may configure the UE 120-2 to transmit one or more signals for the network node 110-2 to perform one or more interference measurements on f2.

As further shown in FIG. 4, and by reference numbers 440 and 450, the UE 120-2 may perform one or more downlink interference measurements and report information associated with the one or more downlink interference measurements to network node 110-2. For example, the UE 120-2 may report an interference level on f2 to network node 110-2.

As further shown in FIG. 4, and by reference number 460, the network node 110-2 may transmit feedback on the extent to which the power control procedure (e.g., the power amplifier backoff adaptation) affected interference on f2. For example, the network node 110-2 may indicate to the network node 110-1 that the backoff adaptation reduced the level of interference on f2 to less than a threshold level. In another example, the network node 110-2 may indicate that the backoff adaptation did not reduce the level of interference on f2 to less than the threshold level, which may cause the network node 110-1 to perform further backoff adaptation.

As indicated above, FIG. 4 is provided as an example. Other examples may differ from what is described with respect to FIG. 4.

As described above, applying a power control procedure can control emissions by a network node. Such power control procedures include a feedback step, in which the network node coordinates with other network nodes to determine an amount of interference, whether a power amplifier backoff adaptation has mitigated the interference, and/or optimize a characteristic of the interference. The feedback step may be achieved through network node coordination algorithms that an operator may deploy with a group of network nodes operating in a common area. However, when different network nodes are operating for different operators, the network nodes may lack coordination algorithms to enable power amplifier backoff adaptation to be successfully performed. For example, a network node associated with a particular operator may not have any awareness of other network nodes associated with other operators and operating on other frequency bands.

Some aspects described herein enable network node power amplifier backoff adaptation in mixed operator operation areas. For example, a network node associated with a first operator may communicate in an area on a first frequency and may trigger UEs to perform measurements of one or more second frequencies that are adjacent to the first frequency. In this case, the network node may receive a measurement report of the measurements that indicates whether there are any network nodes associated with a second operator communicating on the second frequency. In this case, the network node can use the indication of whether there are any network nodes associated with a second operator communicating on the second frequency to determine whether to apply power amplifier backoff adaptation to minimize ACI on the second frequency. In this way, the network node can efficiently perform power amplifier backoff, thereby reducing power consumption by the network node and interference on adjacent channels.

Figure 5:
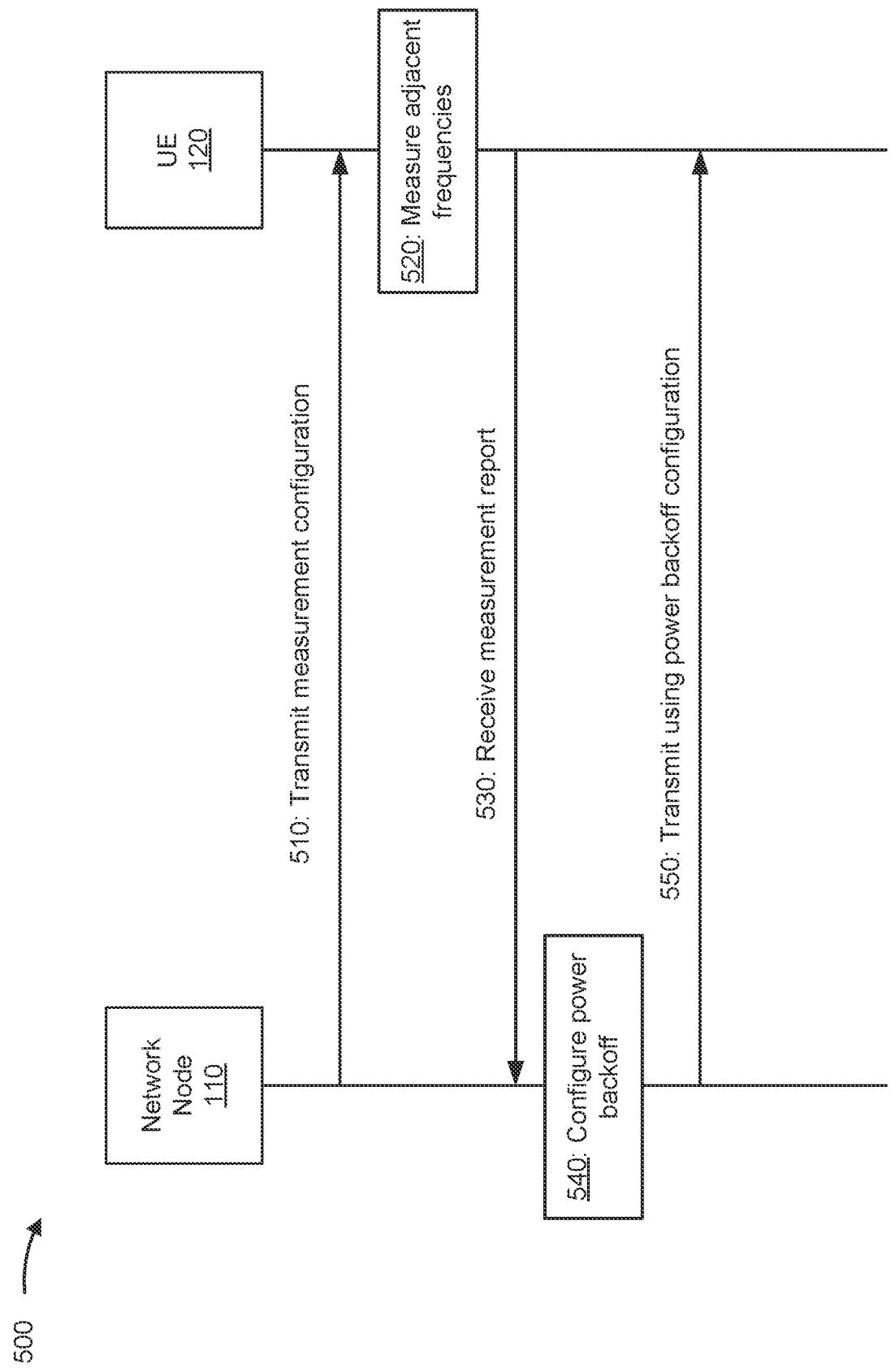
FIG. 5 is a diagram illustrating an example associated with measuring adjacent carrier frequencies for power backoff control, in accordance with the present disclosure.

FIG. 5 is a diagram illustrating an example 500 associated with measuring adjacent carrier frequencies for power backoff control, in accordance with the present disclosure. As shown in FIG. 5, example 500 includes communication between a network node 110 and a UE 120. In some aspects, the network node 110 may be associated with a first operator and configured to communicate with the UE 120 on an assigned operating carrier frequency. One or more other network nodes (not shown) may be associated with one or more second operators and may communicate on one or more carrier frequencies adjacent to the assigned operating carrier frequency. A first frequency may be adjacent to a second frequency when the first frequency is consecutive to the second frequency, contiguous to the second frequency, within a frequency range of the second frequency (e.g., allowing for a relatively small gap between "adjacent" frequencies), or is capable of being interfered with as a result of transmissions on the second frequency.

As further shown in FIG. 5, and by reference numbers 510, 520, and 530, the network node 110 may transmit information identifying a measurement configuration, the UE 120 may measure in accordance with the measurement configuration, and the UE 120 may transmit a measurement report. For example, the network node 110, which is associated with a first operator, may be configured to communicate with the UE 120 at a first frequency and may identify one or more second frequencies at which the UE 120 is to perform measurements to identify a presence of any other network nodes 110 associated with any second operators.

In some aspects, the network node 110 may identify which frequencies the UE 120 is to measure for generating a measurement report. For example, the network node 110 may identify one or more carrier frequencies (one or more second frequencies) adjacent to an operating carrier frequency of the network node 110 (a first frequency) at which ACI is expected to leak from transmissions on the operating carrier frequency. In some aspects, the one or more second frequencies may be based at least in part on a configured parameter. For example, the network node may pass an ARFCN-ValueNR parameter to identify a list of adjacent carrier frequencies not belonging to the same operator as the network node 110. In this case, the UE 120 may perform RSSI measurement over the list of adjacent carrier frequencies during a measurement duration configured by another parameter AdjacentCarrierRssiMeasurementDuration. The network node 110 may provide the parameter identifying the measurement duration in the measurement configuration. The network node 110 may determine the frequencies to include in the list of adjacent carrier frequencies based at least in part on a carrier frequency raster. For example, the network node 110 may be configured with a carrier frequency raster $N_{REF}$, as described in more detail in 3GPP Technical Specification (TS) 38.101, and may compute a range of adjacent carrier frequencies based at least in part on a configured equation, as described in more detail in 3GPP TS 38.101.

Additionally, or alternatively, the UE 120 may perform another type of measurement. For example, the network node 110 may configure the UE 120 to perform an energy detection measurement in an adjacent carrier frequency. In this case, the UE 120 may attempt to determine whether a minimum energy threshold Xmin is satisfied on a carrier frequency that the UE 120 is measuring. The minimum energy threshold may be based at least in part on a serving cell configuration information element transmitted by the network node 110. Additionally, or alternatively, the UE 120 may perform a plurality of types of measurement, such as an RSSI measurement and an energy detection measurement on the same or different adjacent carrier frequencies. Although some aspects are described herein in terms of one type of measurement, such as an RSSI measurement, it is contemplated that aspects described herein may apply to another type or other types of measurements, such as an energy detection measurement.

In some aspects, the network node 110 may transmit the measurement configuration in a type of message. For example, the network node 110 may transmit an RRC configuration or reconfiguration message to convey the measurement configuration (e.g., as a measConfig parameter). In this case, the measurement configuration may include a measurement object (measObject) conveying a ListOfAdjacentCarriersOtherOperatorsARFCN-ValueNR parameter to identify the adjacent carrier frequencies. The measurement object may be configured with an identifier and a measurement report configuration that indicates one or more parameters for the UE 120 to use in generating the measurement report. In some aspects, the network node 110 may convey the measurement object in a system information block (SIB) message. For example, the network node 110 may transmit a SIB 2, SIB 4, or SIB 5 to convey the measurement object to the UE 120 and configure the UE 120 for performing measurements to enable a power amplifier power backoff configuration.

In some aspects, the network node 110 may indicate that the UE 120 is to perform measurements of frequencies associated with different technologies. For example, the network node 110 may configure the UE 120 to perform measurements of RSSI values or other measurements on an evolved UMTS terrestrial radio access (E-UTRA) technology, a WiFi technology, or a Bluetooth technology, among other examples.

In some aspects, the UE 120 may perform an indicated type of measurement based at least in part on the measurement configuration. For example, the UE 120 may perform a received signal strength measurement to determine an RSSI value. In this case, when the RSSI value exceeds a configured threshold, the UE 120 and/or the network node 110 may determine that another network node associated with another operator is operating on at least one of the one or more second frequencies. For example, the UE 120 may determine that another network node is present and may report the other network node to the network node 110, as described herein. Additionally, or alternatively, the UE 120 may report the RSSI value and the network node 110 may determine that another network node is present, as described herein.

In some aspects, the UE 120 may be configured to only transmit the measurement report when an operator is detected. For example, the UE 120 may be configured to transmit the measurement report when the RSSI value exceeds a threshold for any frequency in the list of ARFCN-ValueNR and to suppress (e.g., forgo transmitting) the measurement report when the RSSI value does not exceed the threshold. In this case, the UE 120 may be configured, in the measurement configuration, with a parameter AdjacentCarrierRSSIThreshold that the UE 120 is to use in determining whether to report that another operator is present on an adjacent carrier frequency. Alternatively, the UE 120 may be configured to transmit the measurement report only when the RSSI value does not exceed the threshold for any frequency. In some aspects, the UE 120 may be configured with a duration parameter indicating a quantity of measurements the UE 120 is to perform before generating a measurement report. For example, the UE 120 may be configured such that the UE 120 is to report another operator on an adjacent carrier frequency when the AdjacentCarrierRSSIThreshold is exceeded for a quantity K consecutive measurements (or non-consecutive measurements within some configured period, such as a configured quantity slots, sub-slots, or symbols).

In some aspects, the UE 120 may perform a measurement of an adjacent carrier frequency when operating in a mode of the UE 120. For example, the UE 120 may perform the measurement during an on duration or an active mode of the UE 120. Additionally, or alternatively, the UE 120 may perform the measurement during an idle or inactive mode of the UE 120. In some aspects, the UE 120 may perform the measurement of the adjacent carrier frequency for a configured duration. For example, the UE 120 may receive, in the measurement configuration, information (e.g., an AdjacentCarrierRssiMeasurementDuration parameter) identifying a duration for performing the adjacent carrier frequency measurement. In this case, the duration may be at least a threshold period of time. For example, the duration may be configured as a quantity N of synchronization signal block (SSB) cycles (where an SSB cycle has an average duration of 160 milliseconds (ms), in some examples). Additionally, or alternatively, the UE 120 may perform the measurement of the adjacent carrier frequency with a configured periodicity. For example, the UE 120 may receive, in the measurement configuration, information identifying a periodicity with which the UE 120 is to perform measurements, such as every slot, every 2nd slot, every 3rd slot, every 4th slot, or a longer periodicity. Additionally, or alternatively, the UE 120 may be configured with an irregular periodicity in which a gap between measurements changes based at least in part on one or more factors (e.g., a previous measurement, a state of the UE, resources of the UE, an activation signal, or another factor).

In some aspects, rather than or in addition to configuring the UE 120 to perform one or more measurements, the network node 110, itself, may perform one or more measurements. For example, the network node 110 may perform one or more RSSI measurements of one or more adjacent carrier frequencies associated with one or more second operators to determine a presence of the one or more second operators. In this case, in some aspects, the network node 110 may perform the one or more RSSI measurements based at least in part on the network node 110 having determined to apply power amplifier backoff adaptation (e.g., based at least in part on the network node 110 having received a measurement report from the UE 120). In some aspects, the network node 110 may change an operating state in connection with performing the one or more measurements. For example, the network node 110 may transition to a sleep mode, idle mode, or inactive mode (e.g., in an uplink direction and/or the downlink direction).

In some aspects, the network node 110 may transmit a message to other communication devices in connection with performing the one or more measurements. For example, the network node 110 may transmit information to other neighbor network nodes indicating that the network node 110 is transitioning to a sleep mode, identifying a sleep mode type and duration, indicating that the network node 110 is performing RSSI measurements in connection with power amplifier backoff adaptation, or indicating a list, ARFCN- ValueNR, of adjacent carrier frequencies for measurement, among other examples. In this case, the network node 110 may use an Xn interface to convey the message regarding the network node 110 performing measurements.

Additionally, or alternatively, the network node 110 may configure the one or more neighbor nodes (e.g., other network nodes 110) to perform one or more measurements. For example, the network node 110 may convey a measurement configuration, as described above, (e.g., via the Xn interface) to the one or more neighbor nodes to trigger, for example, RSSI measurements. Additionally, or alternatively, the network node 110 may request that the neighbor nodes have one or more UEs associated with the neighbor nodes perform RSSI measurements and report the RSSI measurements to the network node 110 via the neighbor nodes. In some aspects, the network node 110 may instruct the one or more neighbor nodes to pause one or more transmissions. For example, the network node 110 may request that the one or more neighbor nodes delay or forgo downlink transmission during a time period in which the UE 120 is configured to perform RSSI measurements.

In some aspects, the network node 110 may convey a triggering parameter to initiate measurement (e.g., by the UE 120). For example, the network node 110 may convey a parameter absenceOfAnyOtherTechnology-r18 with a first value ('TRUE') to indicate that the network node 110 is not aware of other systems operating on the adjacent carrier frequency (e.g., and is requesting that the UE 120 detect whether other systems are operating on the adjacent carrier frequency). In this case, when the network node 110 is aware of other systems, such as radar or air control systems, operating at the adjacent frequency, the network node 110 can convey the parameter (e.g., with a second value ('FALSE')) to suppress measurement on the adjacent carrier frequency. In some aspects, the network node 110 may convey the triggering parameter via a serving cell configuration (e.g., for a connected mode UE 120) or a SIB 2, SIB 4, or SIB 5 (e.g., for an idle mode UE). The network node 110 may update or change a value for the parameter over time, such as when other systems only operate periodically on the adjacent carrier frequency.

As further shown in FIG. 5, and by reference number 540 and 550, the network node 110 may configure a power backoff value and transmit using the power backoff configuration. For example, the network node 110 may receive the measurement report from the UE 120 and may determine an amount of power backoff to apply to a power amplifier of the network node 110 for subsequent transmissions.

In some aspects, the network node 110 may determine to perform power amplifier backoff adaptation. For example, when the network node 110 determines that no other operators are detected on adjacent carrier frequencies (e.g., based at least in part on an RSSI value), the network node 110 may perform power amplifier backoff adaptation. Alternatively, when the network node 110 determines that another operator is present on an adjacent carrier frequency, the network node 110 may forgo performing power amplifier backoff adaptation.

As indicated above, FIG. 5 is provided as an example. Other examples may differ from what is described with respect to FIG. 5.

Figure 6:
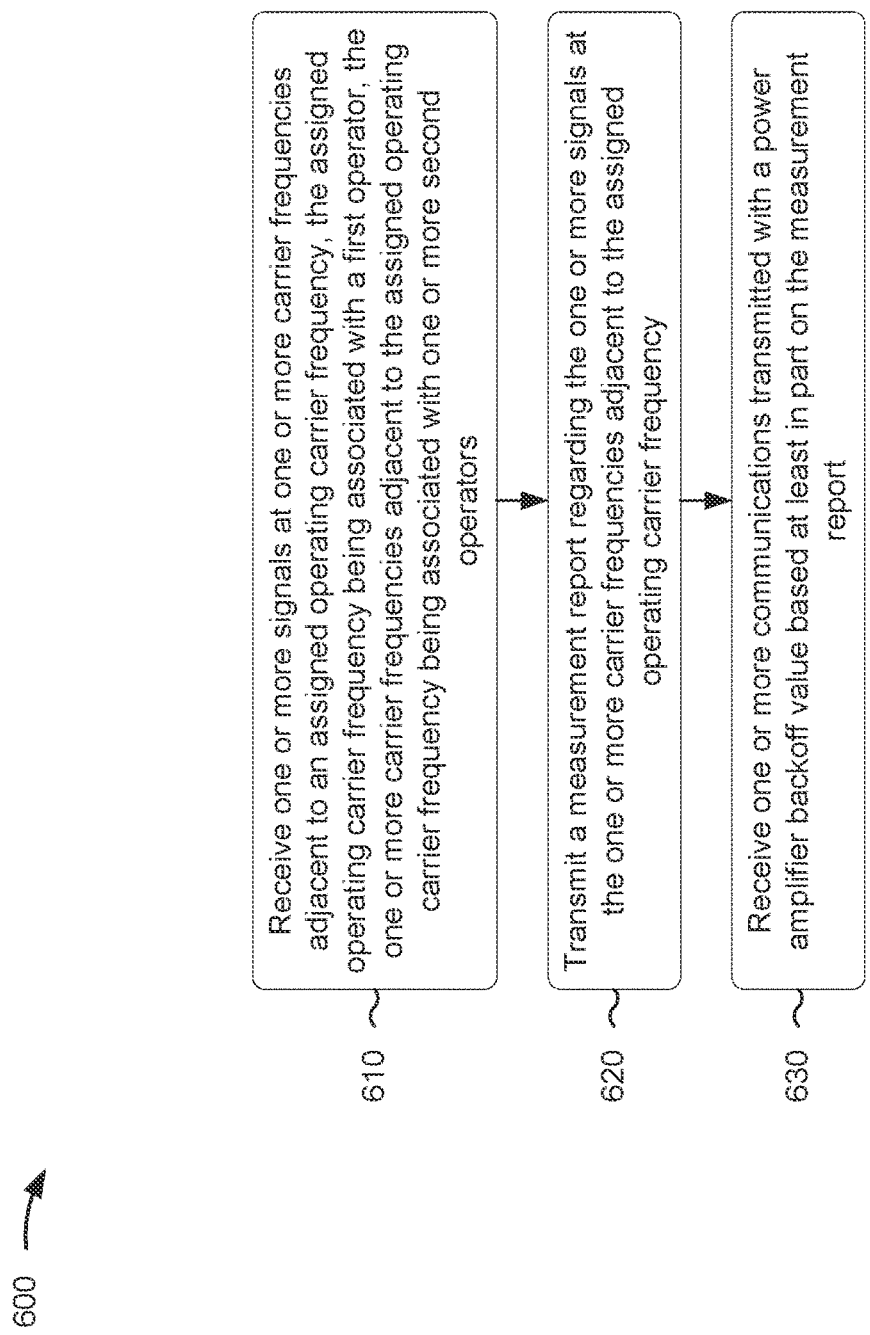
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with techniques for measuring adjacent carrier frequencies for power backoff control.

As shown in FIG. 6, in some aspects, process 600 may include receiving one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators (block 610). For example, the UE (e.g., using communication manager 140 and/or reception component 802, depicted in FIG. 8) may receive one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators, as described above.

As further shown in FIG. 6, in some aspects, process 600 may include transmitting a measurement report regarding the one or more signals at the one or more carrier frequencies adjacent to the assigned operating carrier frequency (block 620). For example, the UE (e.g., using communication manager 140 and/or transmission component 804, depicted in FIG. 8) may transmit a measurement report regarding the one or more signals at the one or more carrier frequencies adjacent to the assigned operating carrier frequency, as described above.

As further shown in FIG. 6, in some aspects, process 600 may include receiving one or more communications transmitted with a power amplifier backoff value based at least in part on the measurement report (block 630). For example, the UE (e.g., using communication manager 140 and/or reception component 802, depicted in FIG. 8) may receive one or more communications transmitted with a power amplifier backoff value based at least in part on the measurement report, as described above.

Process 600 may include additional aspects, such as any single aspect or any combination of aspects described below and/or in connection with one or more other processes described elsewhere herein.

In a first aspect, the measurement report includes information identifying a received signal strength indicator for the one or more signals.

In a second aspect, alone or in combination with the first aspect, the measurement report indicates whether the one or more second operators are communicating on the one or more carrier frequencies adjacent to the assigned operating carrier frequency.

In a third aspect, alone or in combination with one or more of the first and second aspects, process 600 includes receiving a measurement report instruction that indicates the one or more carrier frequencies, adjacent to the assigned operating carrier frequency, at which to perform a measurement.

In a fourth aspect, alone or in combination with one or more of the first through third aspects, process 600 includes receiving a configuration for measurement of the one or more signals using at least one of a radio resource control message, a measurement configuration message, a measurement object message, or a system information block message.

In a fifth aspect, alone or in combination with one or more of the first through fourth aspects, process 600 includes measuring the one or more signals in a connected mode.

In a sixth aspect, alone or in combination with one or more of the first through fifth aspects, process 600 includes measuring the one or more signals in an idle mode.

In a seventh aspect, alone or in combination with one or more of the first through sixth aspects, process 600 includes measuring the one or more signals for a measurement duration, the measurement duration being at least one synchronization signal block cycle.

In an eighth aspect, alone or in combination with one or more of the first through seventh aspects, process 600 includes measuring the one or more signals with a measurement periodicity, the measurement periodicity being less than a configured quantity of slots.

In a ninth aspect, alone or in combination with one or more of the first through eighth aspects, the transmission of the measurement report is based at least in part on a measurement of the one or more signals satisfying a measurement threshold for a configured duration.

In a tenth aspect, alone or in combination with one or more of the first through ninth aspects, process 600 includes performing an energy detection measurement of the one or more signals.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
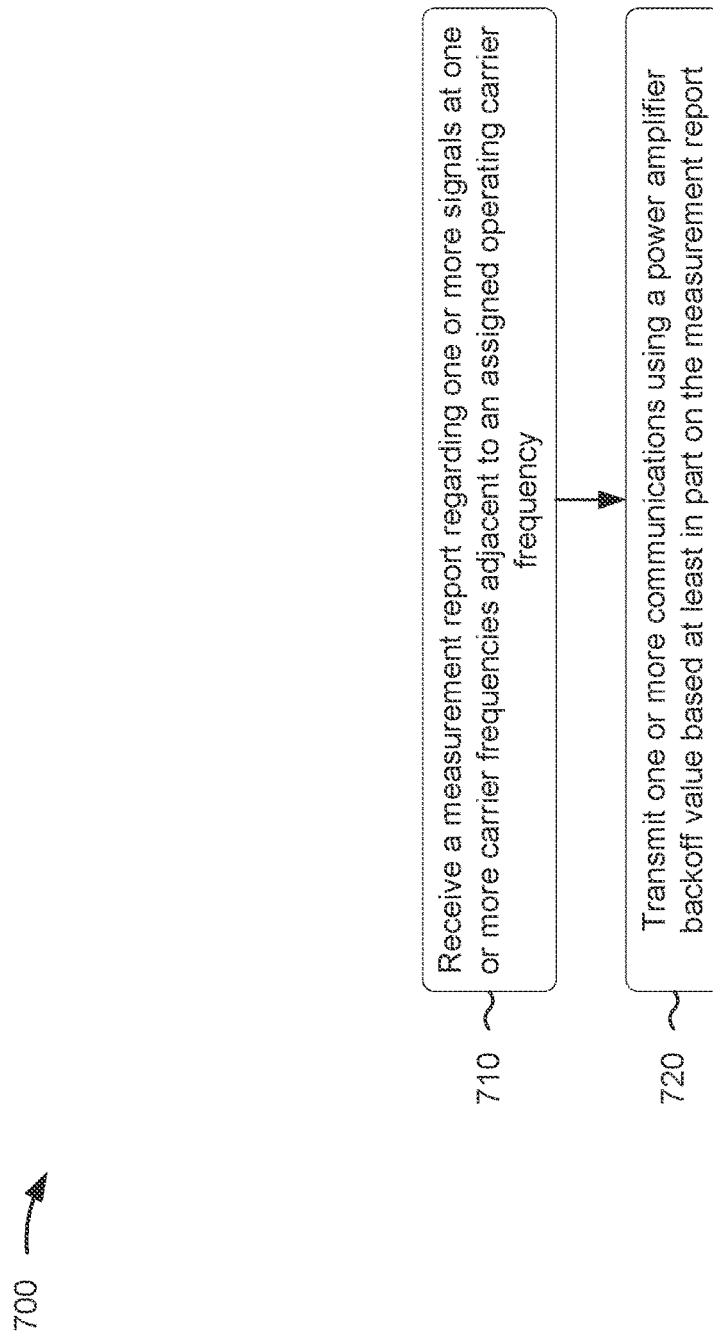
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with techniques for measuring adjacent carrier frequencies for power backoff control.

As shown in FIG. 7, in some aspects, process 700 may include receiving a measurement report regarding one or more signals at one or more carrier frequencies adjacent to an assigned operating carrier frequency (block 710). For example, the network node (e.g., using communication manager 150 and/or reception component 902, depicted in FIG. 9) may receive a measurement report regarding one or more signals at one or more carrier frequencies adjacent to an assigned operating carrier frequency, as described above.

As further shown in FIG. 7, in some aspects, process 700 may include transmitting one or more communications using a power amplifier backoff value based at least in part on the measurement report (block 720). For example, the network node (e.g., using communication manager 150 and/or transmission component 904, depicted in FIG. 9) may transmit one or more communications using a power amplifier backoff value based at least in part on the measurement report, as described above.

Process 700 may include additional aspects, such as any single aspect or any combination of aspects described below and/or in connection with one or more other processes described elsewhere herein.

In a first aspect, the measurement report includes information identifying a received signal strength indicator for the one or more signals.

In a second aspect, alone or in combination with the first aspect, the network node is associated with a first operator, and wherein the measurement report indicates whether one or more second operators are communicating on the one or more carrier frequencies adjacent to the assigned operating carrier frequency.

In a third aspect, alone or in combination with one or more of the first and second aspects, process 700 includes transmitting a measurement report instruction to indicate the one or more carrier frequencies, adjacent to the assigned operating carrier frequency, at which to perform a measurement.

In a fourth aspect, alone or in combination with one or more of the first through third aspects, the power amplifier backoff value is applied to the one or more communications based at least in part on the measurement report indicating that no operator is detected at the one or more carrier frequencies.

In a fifth aspect, alone or in combination with one or more of the first through fourth aspects, the assigned operating carrier frequency is associated with a first operator and the one or more carrier frequencies adjacent to the assigned operating carrier frequency are associated with one or more second operators.

In a sixth aspect, alone or in combination with one or more of the first through fifth aspects, process 700 includes configuring measurement of the one or more signals using at least one of a radio resource control message, a measurement configuration message, a measurement object message, or a system information block message.

In a seventh aspect, alone or in combination with one or more of the first through sixth aspects, process 700 includes configuring measurement of the one or more signals to occur in a connected mode.

In an eighth aspect, alone or in combination with one or more of the first through seventh aspects, process 700 includes configuring measurement of the one or more signals to occur in an idle mode.

In a ninth aspect, alone or in combination with one or more of the first through eighth aspects, process 700 includes configuring a measurement duration for measurement of the one or more signals, the measurement duration being at least one synchronization signal block cycle.

In a tenth aspect, alone or in combination with one or more of the first through ninth aspects, process 700 includes configuring a measurement periodicity for measurement of the one or more signals, the measurement periodicity being less than a configured quantity of slots.

In an eleventh aspect, alone or in combination with one or more of the first through tenth aspects, process 700 includes configuring a measurement threshold for measurement of the one or more signals, the measurement report being received based at least in part on a measurement of the one or more signals satisfying the measurement threshold for a configured duration.

In a twelfth aspect, alone or in combination with one or more of the first through eleventh aspects, process 700 includes performing a measurement of at least one of the one or more carrier frequencies adjacent to the assigned operating carrier frequency, and identifying the power amplifier backoff value based at least in part on the measurement.

In a thirteenth aspect, alone or in combination with one or more of the first through twelfth aspects, process 700 includes transitioning to a reduced power mode in connection with performing the measurement.

In a fourteenth aspect, alone or in combination with one or more of the first through thirteenth aspects, process 700 includes transmitting information associated with indicating the transition to the reduced power mode to one or more neighbor nodes.

In a fifteenth aspect, alone or in combination with one or more of the first through fourteenth aspects, process 700 includes transmitting, to one or more neighbor nodes, a request to alter a transmission configuration during a duration associated with one or more measurements of the measurement report.

In a sixteenth aspect, alone or in combination with one or more of the first through fifteenth aspects, the measurement report is received from a neighbor node based at least in part on one or more measurements performed by the neighbor node or one or more UEs associated therewith.

In a seventeenth aspect, alone or in combination with one or more of the first through sixteenth aspects, process 700 includes configuring, for the measurement report, an energy detection measurement of the one or more signals.

In an eighteenth aspect, alone or in combination with one or more of the first through seventeenth aspects, process 700 includes transmitting a parameter associated with identifying whether another system is present in the one or more carrier frequencies adjacent to the assigned operating carrier frequency to trigger the measurement report.

In a nineteenth aspect, alone or in combination with one or more of the first through eighteenth aspects, process 700 includes identifying the power amplifier backoff value for a power amplifier based at least in part on the measurement report.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
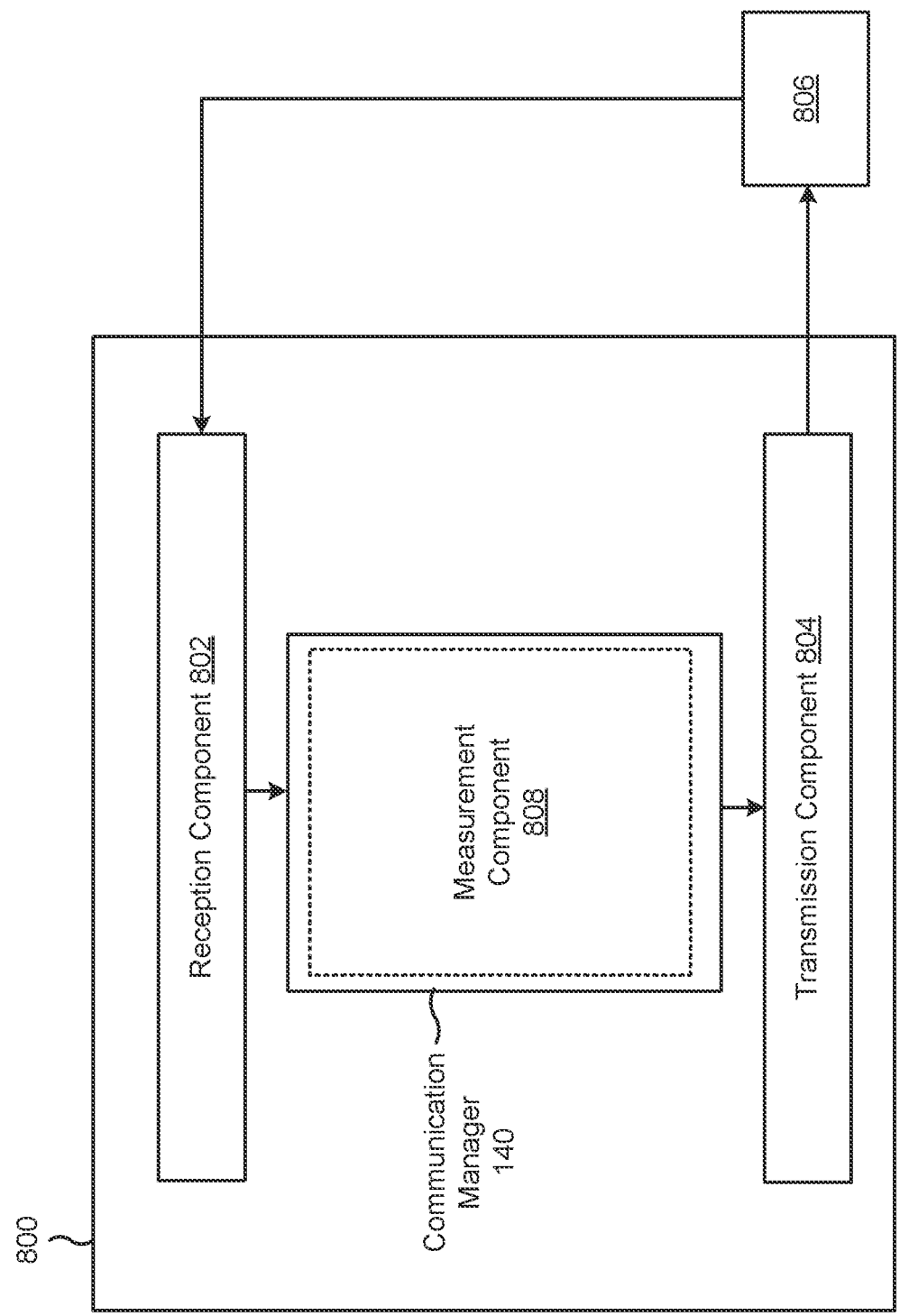
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a measurement component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators. The transmission component 804 may transmit a measurement report regarding the one or more signals at the one or more carrier frequencies adjacent to the assigned operating carrier frequency. The reception component 802 may receive one or more communications transmitted with a power amplifier backoff value based at least in part on the measurement report.

The reception component 802 may receive a measurement report instruction that indicates the one or more carrier frequencies, adjacent to the assigned operating carrier frequency, at which to perform a measurement.

The reception component 802 may receive a configuration for measurement of the one or more signals using at least one of a radio resource control message, a measurement configuration message, a measurement object message, or a system information block message. The measurement component 808 may measure the one or more signals in a connected mode. The measurement component 808 may measure the one or more signals in an idle mode. The measurement component 808 may measure the one or more signals for a measurement duration, the measurement duration being at least one synchronization signal block cycle. The measurement component 808 may measure the one or more signals with a measurement periodicity, the measurement periodicity being less than a configured quantity of slots. The measurement component 808 may perform an energy detection measurement of the one or more signals.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
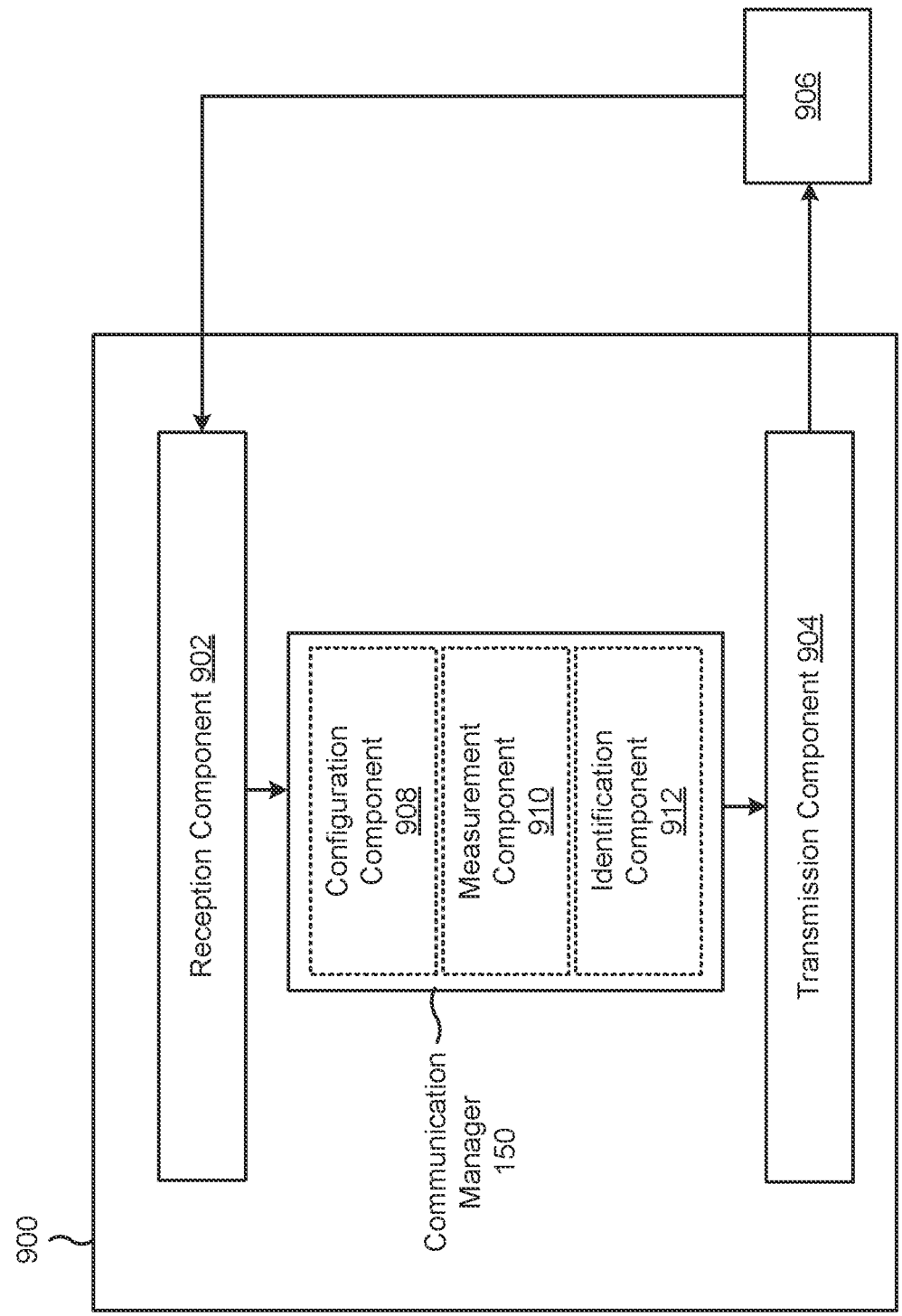
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of a configuration component 908, a measurement component 910, or an identification component 912, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The reception component 902 may receive a measurement report regarding one or more signals at one or more carrier frequencies adjacent to an assigned operating carrier frequency. The transmission component 904 may transmit one or more communications using a power amplifier backoff value based at least in part on the measurement report. The transmission component 904 may transmit a measurement report instruction to indicate the one or more carrier frequencies, adjacent to the assigned operating carrier frequency, at which to perform a measurement. The configuration component 908 may configure measurement of the one or more signals using at least one of a radio resource control message, a measurement configuration message, a measurement object message, or a system information block message. The configuration component 908 may configure measurement of the one or more signals to occur in a connected mode. The configuration component 908 may configure measurement of the one or more signals to occur in an idle mode. The configuration component 908 may configure a measurement duration for measurement of the one or more signals, the measurement duration being at least one synchronization signal block cycle. The configuration component 908 may configure a measurement periodicity for measurement of the one or more signals, the measurement periodicity being less than a configured quantity of slots.

The configuration component 908 may configure a measurement threshold for measurement of the one or more signals, the measurement report being received based at least in part on a measurement of the one or more signals satisfying the measurement threshold for a configured duration. The measurement component 910 may perform a measurement of at least one of the one or more carrier frequencies adjacent to the assigned operating carrier frequency. The identification component 912 may identify the power amplifier backoff value based at least in part on the measurement. The configuration component 908 may transition the apparatus 900 to a reduced power mode in connection with performing the measurement. The transmission component 904 may transmit information associated with indicating the transition to the reduced power mode to one or more neighbor nodes.

The transmission component 904 may transmit, to one or more neighbor nodes, a request to alter a transmission configuration during a duration associated with one or more measurements of the measurement report. The configuration component 908 may configure, for the measurement report, an energy detection measurement of the one or more signals. The transmission component 904 may transmit a parameter associated with identifying whether another system is present in the one or more carrier frequencies adjacent to the assigned operating carrier frequency to trigger the measurement report. The identification component 912 may identify the power amplifier backoff value for a power amplifier based at least in part on the measurement report.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators; transmitting a measurement report regarding the one or more signals at the one or more carrier frequencies adjacent to the assigned operating carrier frequency; and receiving one or more communications transmitted with a power amplifier backoff value based at least in part on the measurement report.

Aspect 2: The method of Aspect 1, wherein the measurement report includes information identifying a received signal strength indicator for the one or more signals.

Aspect 3: The method of any of Aspects 1 to 2, wherein the measurement report indicates whether the one or more second operators are communicating on the one or more carrier frequencies adjacent to the assigned operating carrier frequency.

Aspect 4: The method of any of Aspects 1 to 3, further comprising: receiving a measurement report instruction that indicates the one or more carrier frequencies, adjacent to the assigned operating carrier frequency, at which to perform a measurement.

Aspect 5: The method of any of Aspects 1 to 4, further comprising: receiving a configuration for measurement of the one or more signals using at least one of: a radio resource control message, a measurement configuration message, a measurement object message, or a system information block message.

Aspect 6: The method of any of Aspects 1 to 5, further comprising: measuring the one or more signals in a connected mode.

Aspect 7: The method of any of Aspects 1 to 6, further comprising: measuring the one or more signals in an idle mode.

Aspect 8: The method of any of Aspects 1 to 7, further comprising: measuring the one or more signals for a measurement duration, the measurement duration being at least one synchronization signal block cycle.

Aspect 9: The method of any of Aspects 1 to 8, further comprising: measuring the one or more signals with a measurement periodicity, the measurement periodicity being less than a configured quantity of slots.

Aspect 10: The method of any of Aspects 1 to 9, wherein the transmission of the measurement report is based at least in part on a measurement of the one or more signals satisfying a measurement threshold for a configured duration.

Aspect 11: The method of any of Aspects 1 to 10, further comprising: performing an energy detection measurement of the one or more signals.

Aspect 12: A method of wireless communication performed by an apparatus of a network node, comprising: receiving a measurement report regarding one or more signals at one or more carrier frequencies adjacent to an assigned operating carrier frequency; and transmitting one or more communications using a power amplifier backoff value based at least in part on the measurement report.

Aspect 13: The method of Aspect 12, wherein the measurement report includes information identifying a received signal strength indicator for the one or more signals.

Aspect 14: The method of any of Aspects 12 to 13, wherein the network node is associated with a first operator, and wherein the measurement report indicates whether one or more second operators are communicating on the one or more carrier frequencies adjacent to the assigned operating carrier frequency.

Aspect 15: The method of any of Aspects 12 to 14, further comprising: transmitting a measurement report instruction to indicate the one or more carrier frequencies, adjacent to the assigned operating carrier frequency, at which to perform a measurement.

Aspect 16: The method of any of Aspects 12 to 15, wherein the power amplifier backoff value is applied to the one or more communications based at least in part on the measurement report indicating that no operator is detected at the one or more carrier frequencies.

Aspect 17: The method of any of Aspects 12 to 16, wherein the assigned operating carrier frequency is associated with a first operator and the one or more carrier frequencies adjacent to the assigned operating carrier frequency are associated with one or more second operators.

Aspect 18: The method of any of Aspects 12 to 17, further comprising: configuring measurement of the one or more signals using at least one of: a radio resource control message, a measurement configuration message, a measurement object message, or a system information block message.

Aspect 19: The method of any of Aspects 12 to 18, further comprising: configuring measurement of the one or more signals to occur in a connected mode.

Aspect 20: The method of any of Aspects 12 to 19, further comprising: configuring measurement of the one or more signals to occur in an idle mode.

Aspect 21: The method of any of Aspects 12 to 20, further comprising: configuring a measurement duration for measurement of the one or more signals, the measurement duration being at least one synchronization signal block cycle.

Aspect 22: The method of any of Aspects 12 to 21, further comprising: configuring a measurement periodicity for measurement of the one or more signals, the measurement periodicity being less than a configured quantity of slots.

Aspect 23: The method of any of Aspects 12 to 22, further comprising: configuring a measurement threshold for measurement of the one or more signals, the measurement report being received based at least in part on a measurement of the one or more signals satisfying the measurement threshold for a configured duration.

Aspect 24: The method of any of Aspects 12 to 23, further comprising: performing a measurement of at least one of the one or more carrier frequencies adjacent to the assigned operating carrier frequency; and identifying the power amplifier backoff value based at least in part on the measurement.

Aspect 25: The method of Aspect 24, further comprising: transitioning to a reduced power mode in connection with performing the measurement.

Aspect 26: The method of any of Aspects 25 to 26, further comprising: transmitting information associated with indicating the transition to the reduced power mode to one or more neighbor nodes.

Aspect 27: The method of any of Aspects 12 to 26, further comprising: transmitting, to one or more neighbor nodes, a request to alter a transmission configuration during a duration associated with one or more measurements of the measurement report.

Aspect 28: The method of any of Aspects 12 to 27, wherein the measurement report is received from a neighbor node based at least in part on one or more measurements performed by the neighbor node or one or more user equipment (UEs) associated therewith.

Aspect 29: The method of any of Aspects 12 to 28, further comprising: configuring, for the measurement report, an energy detection measurement of the one or more signals.

Aspect 30: The method of any of Aspects 12 to 29, further comprising: transmitting a parameter associated with identifying whether another system is present in the one or more carrier frequencies adjacent to the assigned operating carrier frequency to trigger the measurement report.

Aspect 31: The method of any of Aspects 12 to 30, further comprising: identifying the power amplifier backoff value for a power amplifier based at least in part on the measurement report.

Aspect 32: An apparatus for wireless communication at a device, comprising a processor; memory coupled with the processor; and instructions stored in the memory and executable by the processor to cause the apparatus to perform the method of one or more of Aspects 1-11.

Aspect 33: A device for wireless communication, comprising a memory and one or more processors coupled to the memory, the one or more processors configured to perform the method of one or more of Aspects 1-11.

Aspect 34: An apparatus for wireless communication, comprising at least one means for performing the method of one or more of Aspects 1-11.

Aspect 35: A non-transitory computer-readable medium storing code for wireless communication, the code comprising instructions executable by a processor to perform the method of one or more of Aspects 1-11.

Aspect 36: A non-transitory computer-readable medium storing a set of instructions for wireless communication, the set of instructions comprising one or more instructions that, when executed by one or more processors of a device, cause the device to perform the method of one or more of Aspects 1-11.

Aspect 37: An apparatus for wireless communication at a device, comprising a processor; memory coupled with the processor; and instructions stored in the memory and executable by the processor to cause the apparatus to perform the method of one or more of Aspects 12-31.

Aspect 38: A device for wireless communication, comprising a memory and one or more processors coupled to the memory, the one or more processors configured to perform the method of one or more of Aspects 12-31.

Aspect 39: An apparatus for wireless communication, comprising at least one means for performing the method of one or more of Aspects 12-31.

Aspect 40: A non-transitory computer-readable medium storing code for wireless communication, the code comprising instructions executable by a processor to perform the method of one or more of Aspects 12-31.

Aspect 41: A non-transitory computer-readable medium storing a set of instructions for wireless communication, the set of instructions comprising one or more instructions that, when executed by one or more processors of a device, cause the device to perform the method of one or more of Aspects 12-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
   receiving one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators;
   measuring the one or more signals at the one or more carrier frequencies adjacent to the assigned operating carrier frequency for a measurement duration comprising at least one synchronization signal block cycle;
   transmitting a measurement report regarding the measuring of one or more signals at the one or more carrier frequencies adjacent to the assigned operating carrier frequency; and
   receiving one or more communications transmitted with a power amplifier backoff value based at least in part on the measurement report.

2. The method of claim 1,
   wherein the measurement report includes information identifying a received signal strength indicator for the one or more signals.

3. The method of claim 1,
   wherein the measurement report indicates whether the one or more second operators are communicating on the one or more carrier frequencies adjacent to the assigned operating carrier frequency.

4. The method of claim 1, further comprising:
receiving a measurement report instruction that indicates the one or more carrier frequencies, adjacent to the assigned operating carrier frequency, at which to perform a measurement, wherein the one or more carrier frequencies are contiguous to or within a threshold range of the assigned operating carrier frequency.

5. The method of claim 1, further comprising:
receiving a configuration for measurement of the one or more signals using at least one of:
a radio resource control message,
a measurement configuration message,
a measurement object message, or
a system information block message.

6. The method of claim 1, further comprising:
measuring the one or more signals in a connected mode.

7. The method of claim 1, further comprising:
measuring the one or more signals in an idle mode.

8. The method of claim 1, further comprising:
measuring the one or more signals with a measurement periodicity, the measurement periodicity being less than a configured quantity of slots.

9. The method of claim 1,
wherein transmitting the measurement report is based at least in part on a measurement of the one or more signals satisfying a measurement threshold for a configured duration.

10. The method of claim 1, further comprising:
performing an energy detection measurement of the one or more signals.

11. A method of wireless communication performed by an apparatus of a network node, comprising:
receiving a measurement report regarding one or more signals at one or more carrier frequencies adjacent to an assigned operating carrier frequency, wherein the measurement report is in accordance with a measurement duration comprising at least one synchronization signal block cycle; and
transmitting one or more communications using a power amplifier backoff value based at least in part on the measurement report.

12. The method of claim 11,
wherein the measurement report includes information identifying a received signal strength indicator for the one or more signals.

13. The method of claim 11,
wherein the network node is associated with a first operator, and wherein the measurement report indicates whether one or more second operators are communicating on the one or more carrier frequencies adjacent to the assigned operating carrier frequency.

14. The method of claim 11, further comprising:
transmitting a measurement report instruction to indicate the one or more carrier frequencies, adjacent to the assigned operating carrier frequency, at which to perform a measurement, wherein the one or more carrier frequencies are contiguous to or within a threshold range of the assigned operating carrier frequency.

15. The method of claim 11,
wherein the power amplifier backoff value is applied to the one or more communications based at least in part on the measurement report indicating that no operator is detected at the one or more carrier frequencies.

16. The method of claim 11,
wherein the assigned operating carrier frequency is associated with a first operator and the one or more carrier frequencies adjacent to the assigned operating carrier frequency are associated with one or more second operators.

17. The method of claim 11, further comprising:
configuring measurement of the one or more signals using at least one of:
a radio resource control message,
a measurement configuration message,
a measurement object message, or
a system information block message.

18. The method of claim 11, further comprising:
configuring measurement of the one or more signals to occur in a connected mode.

19. The method of claim 11, further comprising:
configuring measurement of the one or more signals to occur in an idle mode.

20. The method of claim 11, further comprising:
configuring the measurement duration for measurement of the one or more signals.

21. The method of claim 11, further comprising:
configuring a measurement periodicity for measurement of the one or more signals, the measurement periodicity being less than a configured quantity of slots.

22. The method of claim 11, further comprising:
configuring a measurement threshold for measurement of the one or more signals, the measurement report being received based at least in part on a measurement of the one or more signals satisfying the measurement threshold for a configured duration.

23. The method of claim 11, further comprising:
performing a measurement of at least one of the one or more carrier frequencies adjacent to the assigned operating carrier frequency; and
identifying the power amplifier backoff value based at least in part on the measurement.

24. The method of claim 23, further comprising:
transitioning to a reduced power mode in connection with performing the measurement.

25. The method of claim 24, further comprising:
transmitting information associated with indicating the transition to the reduced power mode to one or more neighbor nodes.

26. The method of claim 11, further comprising:
transmitting, to one or more neighbor nodes, a request to alter a transmission configuration during a duration associated with one or more measurements of the measurement report.

27. The method of claim 11,
wherein the measurement report is received from a neighbor node based at least in part on one or more measurements performed by the neighbor node or one or more user equipment (UEs) associated therewith.

28. A user equipment (UE) for wireless communication, comprising:
one or more memories; and
one or more processors, coupled to the one or more memories, configured to:
receive one or more signals at one or more carrier frequencies adjacent to an assigned operating carrier frequency, the assigned operating carrier frequency being associated with a first operator, the one or more carrier frequencies adjacent to the assigned operating carrier frequency being associated with one or more second operators;
measure the one or more signals at the one or more carrier frequencies adjacent to the assigned operating carrier frequency for a measurement duration comprising at least one synchronization signal block cycle;

transmit a measurement report regarding the measurement of one or more signals at the one or more carrier frequencies adjacent to the assigned operating carrier frequency; and receive one or more communications transmitted with a power amplifier backoff value based at least in part on the measurement report.

29. A network node for wireless communication, comprising:

one or more memories; and one or more processors, coupled to the one or more memories, configured to:

receive a measurement report regarding one or more signals at one or more carrier frequencies adjacent to an assigned operating carrier frequency, wherein the measurement report is in accordance with a measurement duration comprising at least one synchronization signal block cycle; and transmit one or more communications using a power amplifier backoff value based at least in part on the measurement report.

30. The network node of claim 29, wherein the one or more processors are further configured to:

configure the measurement duration for measurement of the one or more signals.

* * * * *